(12) United States Patent
Minoura et al.

(10) Patent No.: US 8,469,402 B2
(45) Date of Patent: Jun. 25, 2013

(54) RIDING MOWER (75) Inventors: Akira Minoura, Osaka (JP); Yoshihiro Ueda, Osaka (JP); Kuninosuke Iwata, Sakai (JP); Hiroyuki Tada, Sakai (JP); Yoshiyuki Esaki, Sakai (JP)

(73) Assignee: Kubota Corporation, Osaka (JP)

( * ) Notice: Subject to any disclaimer, the term of this patent is extended or adjusted under 35 U.S.C. 154(b) by 206 days.

(21) Appl. No.: 13/046,278

(22) Filed: Mar. 11, 2011

(65) Prior Publication Data
US 2012/0023886 A1    Feb. 2, 2012

(30) Foreign Application Priority Data
Jul. 28, 2010    (JP) .................................. 2010-169592

(51) Int. Cl.
*B60P 3/22*    (2006.01)
(52) U.S. Cl.
USPC ............................. 280/830; 280/834; 280/839
(58) Field of Classification Search
USPC ............... 280/830, 834, 839; 248/346.1, 505, 248/240
See application file for complete search history.

(56) References Cited

U.S. PATENT DOCUMENTS

| 4,025,080 | A  | * | 5/1977  | Gedeon .......................... 280/834 |
| 4,770,428 | A  | * | 9/1988  | Sugiyama ...................... 280/834 |
| 5,330,031 | A  | * | 7/1994  | Hill et al. ....................... 180/271 |
| 5,581,986 | A  | * | 12/1996 | Calver ........................... 56/12.7 |
| 5,806,892 | A  | * | 9/1998  | Colburn ......................... 280/834 |
| 5,845,940 | A  | * | 12/1998 | Colburn ......................... 280/830 |
| 5,884,460 | A  | * | 3/1999  | Serravalle et al. .................. 56/1 |
| 5,975,574 | A  | * | 11/1999 | Warth ........................... 280/834 |
| 6,637,706 | B2 | * | 10/2003 | Kim et al. ...................... 248/154 |
| 8,172,268 | B2 | * | 5/2012  | Komorida et al. ............. 280/830 |
| 8,276,704 | B2 | * | 10/2012 | Landoll et al. ................ 180/235 |
| 2010/0051567 | A1 | * | 3/2010 | Ross, Jr. ..................... 211/85.18 |
| 2010/0065595 | A1 | * | 3/2010 | Brogden ....................... 224/401 |

FOREIGN PATENT DOCUMENTS
JP    2000-351330    12/2000

* cited by examiner

*Primary Examiner* — Tashiana Adams
*Assistant Examiner* — Marlon Arce
(74) *Attorney, Agent, or Firm* — Greenblum & Bernstein, P.L.C.

(57) ABSTRACT

A riding mower having left and right driving rear wheels independently drivable forward and backward and a pair of left and right steerable front wheels is provided with a support device capable of being mounted with a cylindrical gas cylinder in a horizontal position on an external side of a rollover projection frame. The support device is provided such that the mounted gas cylinder is positioned along front and rear of the rollover protection frame and is mounted in a tilted state in which the central axis of the cylindrical gas cylinder is closer to a central side in a lateral direction of a vehicle body toward a rear side from a plan view.

5 Claims, 8 Drawing Sheets

FIG. 7 ical axis of the cylindrical gas cylinder is closer to the central side in the lateral direction of the vehicle body toward the rear side from a plan view. Therefore, the gas cylinder is tilted.

RIDING MOWER

CROSS-REFERENCE TO RELATED APPLICATIONS

The present application claims priority under 35 U.S.C. §119 of Japanese Application No. 2010-169592, filed on Jul. 28, 2010, which is herein expressly incorporated by reference in its entirety.

BACKGROUND OF THE INVENTION

1. Field of the Invention

The present invention relates to a riding mower having left and right driving rear wheels independently drivable forward and backward, a pair of left and right steerable front wheels, a driver's seat provided in a space between the rear wheels and the front wheels, and a gate-shaped rollover protection frame having a lower end side fixed to a left and right positions on the rear side of the driver's seat.

2. Description of Related Art

Such a riding mower having left and right driving rear wheels independently drivable forward and backward and a pair of left and right steerable front wheels is generally mounted with a gasoline engine. A fuel tank is provided under an engine hood or under a rear wheel fender between the rear wheel fender and the rear wheel (refer to Related Art 1).

[Related Art 1] Japanese Patent Laid-Open Publication No. 2000-351330 (paragraph [0029]; FIGS. 1 and 2)

Fuel gas, such as LP gas, has recently been attempted to be used as an alternative fuel to gasoline in view of benefits of the fuel gas, such as LP gas, in reduction in $CO_2$ and fuel cost. To use the fuel gas, such as LP gas, however, a large capacity gas cylinder should be mounted for driving. It is difficult in view of space to place such a gas cylinder under an engine hood or under a rear wheel fender. It is thus considered to dispose the gas cylinder on the engine hood or on the rear wheel fender. In either case, providing a large gas cylinder in a relatively high position on a vehicle body possibly destabilizes the vehicle body due to the high gravity center and obscures rearward visibility or side visibility.

SUMMARY OF THE INVENTION

An advantage of the present invention is to provide a riding mower in which a gas cylinder is mounted in a relatively low position of a vehicle body to be supported stably and in a position less likely to block occupant's visibility, with a reduced possibility of interference with other objects.

In view of the circumstances above, a first aspect of the present invention provides a riding mower having left and right driving rear wheels independently drivable forward and backward, a pair of left and right steerable front wheels, a driver's seat provided in a space between the rear wheels and the front wheels, and a gate-shaped rollover protection frame having a lower end side fixed to left and right positions on a rear side of the driver's seat includes a support device provided on an external side of the rollover projection frame and capable of being mounted with a cylindrical gas cylinder in a horizontal position. The support device is provided such that the mounted gas cylinder is positioned along front and rear of the rollover protection frame and is mounted in a tilted state in which a central axis of the cylindrical gas cylinder is closer to a central side in a lateral direction of a vehicle body toward a rear side from a plan view.

According to the riding mower of the first aspect, the external side portion of the rollover protection frame is positioned relatively low and distant from the driver's seat or the engine hood even on the vehicle body. The gas cylinder is thus disposed in the low position by effectively using a space on the vehicle body. Accordingly, the gravity center of the vehicle body is prevented from being positioned excessively high, and rearward visibility or side visibility is unlikely to be obscured. Furthermore, the low mounting position reduces labor in loading and unloading a gas cylinder.

In addition, the support device is provided such that the gas cylinder is mounted in a tilted state in which the central axis of the cylindrical gas cylinder is closer to the central side in the lateral direction of the vehicle body toward the rear side from a plan view. The gas cylinder can thus be disposed in a state in which the rear end side is provided as close as possible to the rotation trajectory of the rear end of the vehicle body, compared with a case in which the central axis of the gas cylinder is provided along the anteroposterior centerline of the vehicle body. In a case where the rear end side of the vehicle body is rotated in a state in which the rear end side of the vehicle body is proximate to a wall, for example, the gas cylinder is not largely out of the rotation trajectory, and thus the vehicle body can be rotated without interfering with the nearby wall and easily moved away from the wall. A possibility of interference with other objects, such as a wall, can thus be reduced.

A second aspect of the present invention provides the riding mower, in which the support device is mounted on the rollover protection frame.

According to the riding mower of the second aspect, the support device of the gas cylinder is supported by the rollover protection frame, which is originally provided with a sturdy structure. Thus, an additional reinforcement structure is not necessary, in which the support device is positioned at a predetermined height and reinforced by a separate reinforcement material. The strength of the rollover protection frame itself is effectively used to solidly support the support device. Furthermore, the support device is provided such that the mounted gas cylinder is positioned along the front and rear of the rollover protection frame. Thereby, the mounted gas cylinder is supported by the rollover protection frame in a position proximate to the anteroposterior center of gravity, and thus is stably held.

A third aspect of the present invention provides the riding mower, in which a position proximate to an anteroposterior center of gravity of the gas cylinder is supported by the rollover protection frame and the support device is provided over an upper side of the rear wheel from a plan view.

According to the riding mower of the third aspect, the position proximate to the anteroposterior center of gravity of the gas cylinder is supported by the rollover protection frame and the support device is provided over the upper side of the rear wheel from a plan view. Thus, the weight of the gas cylinder is exerted proximate to a ground contact point of the rear wheel. Accordingly, it is unlikely that the anteroposterior balance of the vehicle body changes in accordance with change in the volume of gas in the gas cylinder, and thus the turning performance is not affected by the change in the anteroposterior balance especially in a case of a small mower.

A fourth aspect of the present invention provides the riding mower, in which the support device is provided with a support base in a position covering the upper side of the rear wheel and in parallel to an anteroposterior direction of the vehicle body, and the central axis of the gas cylinder is tilted relative to left and right sides of the support base from a plan view.

According to the riding mower of the fourth aspect, the central axis of the gas cylinder is tilted relative to the left and right sides of the support base from a plan view, the central axis being tilted so as to closer to the central side in the lateral direction of the vehicle body toward the rear side from the plan view. The support base is provided in a position covering the upper side of the rear wheel and in parallel to the anteroposterior direction of the vehicle body. Thus, the support base, which is also provided in parallel to the rear wheel, serves as a protection cover of the upper side of the rear wheel as well as a mud cover of the rear wheel.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt made to show structural details of the present invention in more detail than is necessary for the fundamental understanding of the present invention, the description is taken with the drawings making apparent to those skilled in the art how the forms of the present invention may be embodied in practice.

An embodiment of the present invention is explained below with reference to the drawings.

Overall Structure of Riding Mower

Figure 1:
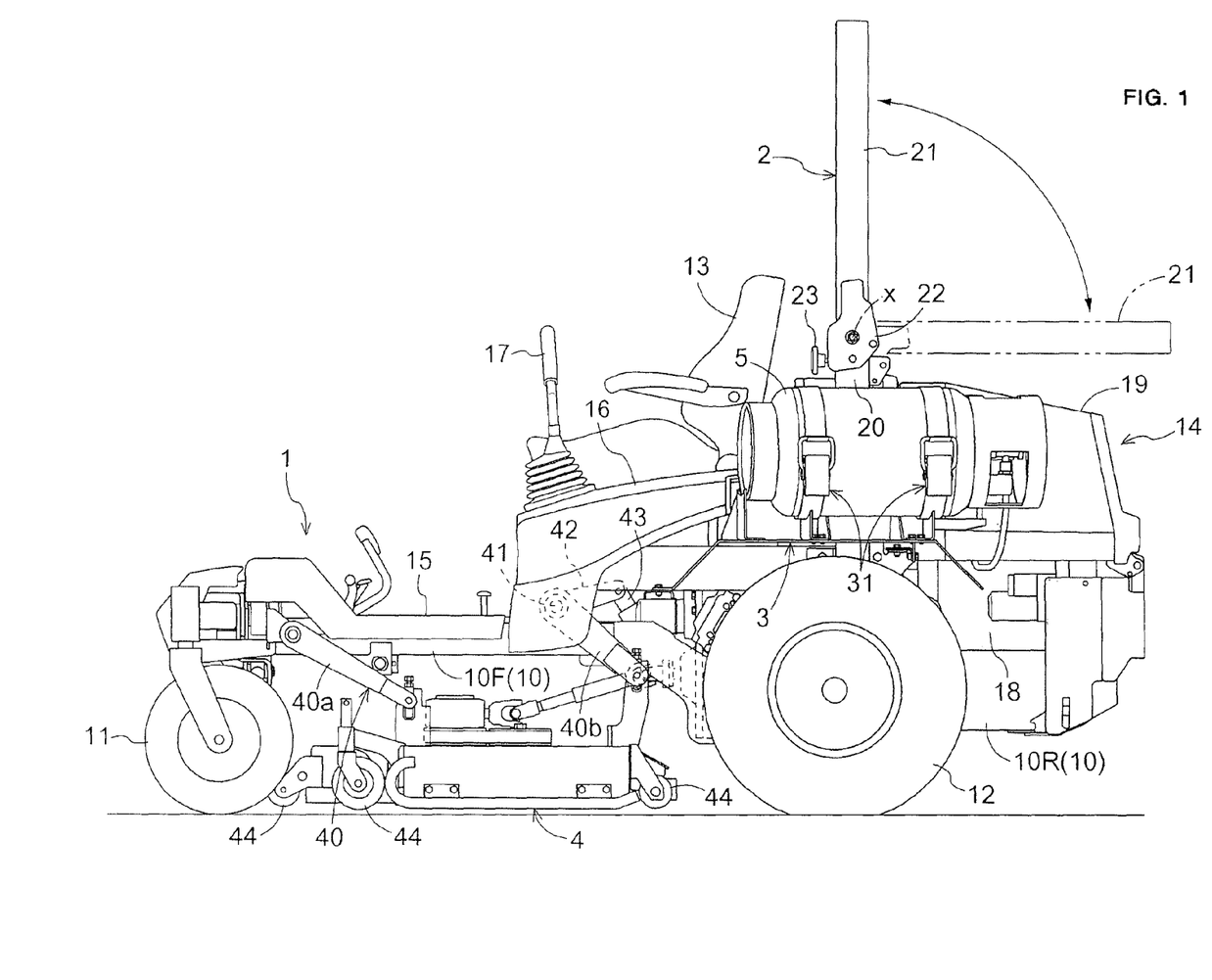
FIG. 1 is an overall side view of a riding mower.
Figure 2:
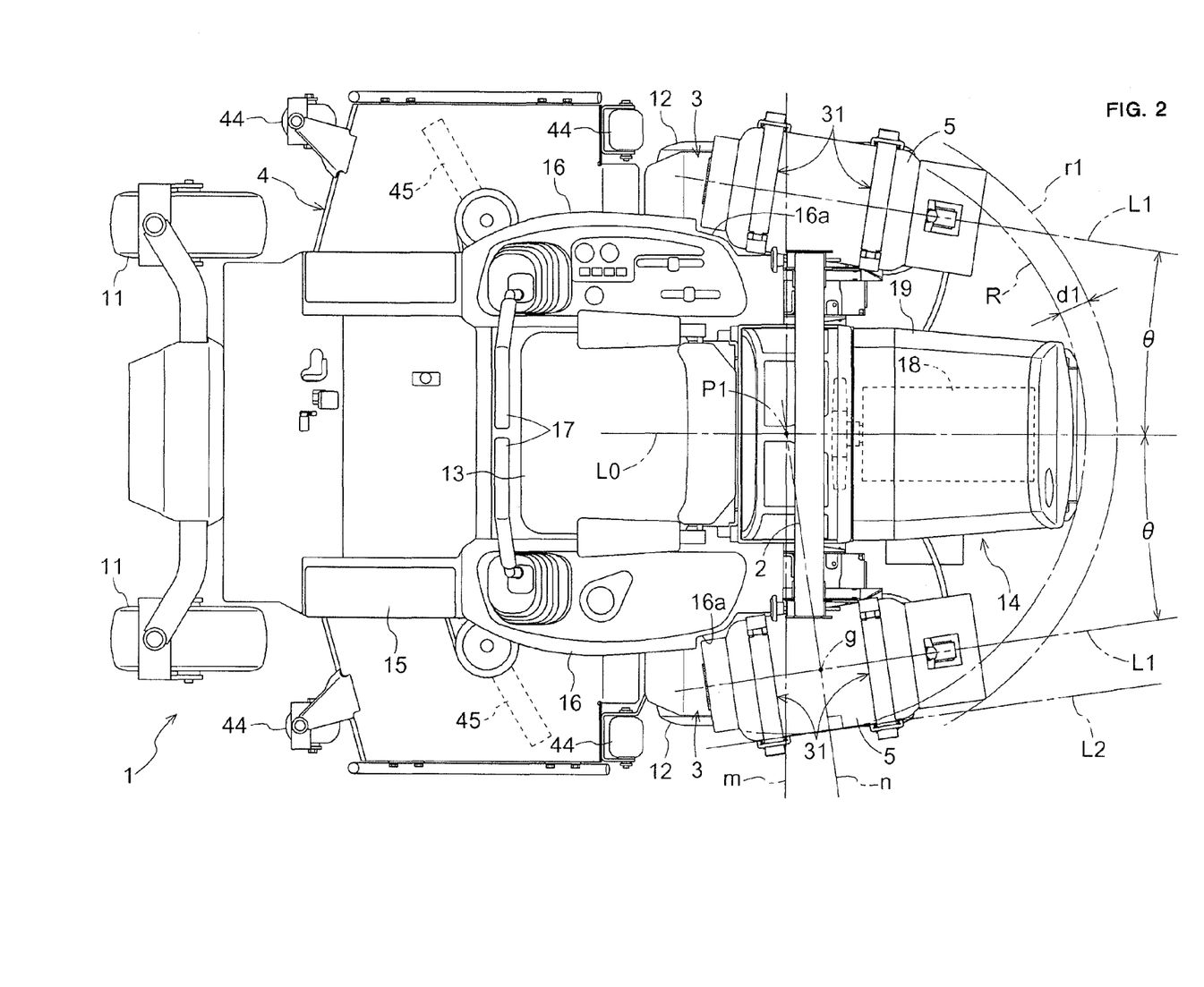
FIG. 2 is an overall plan view of the riding mower.
Figure 3:
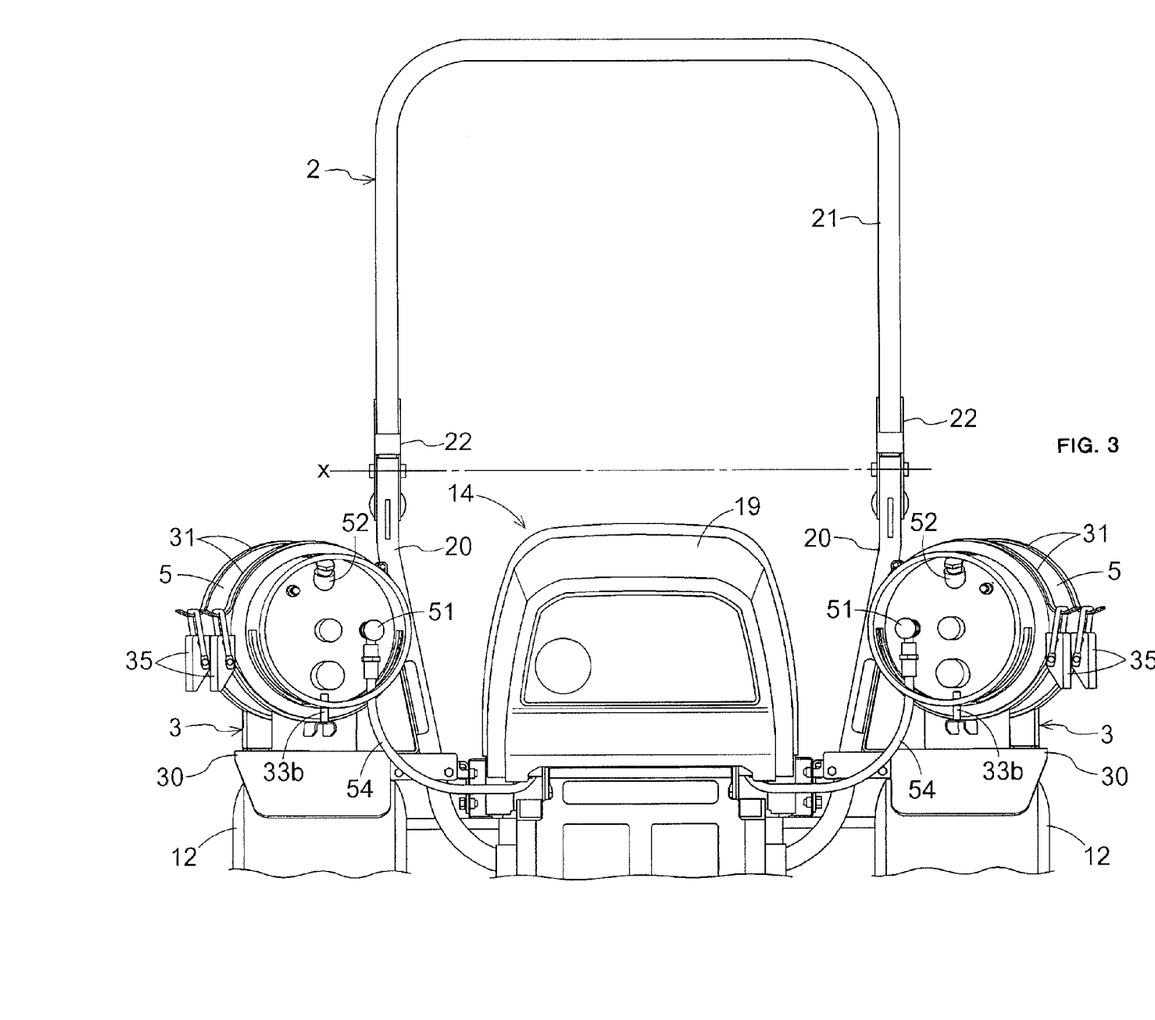
FIG. 3 is a rear view illustrating the upper side of the riding mower.

FIG. 1 is an overall side view of a riding mower according to the present invention, as an example of a working vehicle. FIG. 2 is an overall plan view thereof. The commonly-called mid-mount riding mower has a bar blade type mower 4 vertically movably suspended and supported between front wheels 11 and rear wheels 12, each provided as a left and right pair, of a self-propelled vehicle body 1 having a vehicle frame 10 supported by the front and rear wheels.

Under a hood 19 in a rear portion of the self-propelled vehicle body 1, a motor portion 14 is provided on a rear frame portion 10R of the vehicle frame 10. The motor portion 14 houses an engine 18 that has the same design as a water-cooled gasoline engine and has a device for fuel supply designed for LP gas. In an anteroposteriorly intermediate portion of the self-propelled vehicle body 1, a driver's seat 13 is positioned in a space between the front wheels 11 and the rear wheels 12 in the anteroposterior direction. In a front frame portion 10F of the vehicle frame 10, a step 15 is mounted to a feet position of the driver's seat 13, and fenders 16 are provided on the left and right sides of the driver's seat 13. In order to avoid interference with a gas cylinder 5 mounted on a support device 3 hereinafter described (in order to place the gas cylinder 5 as inside as possible), the left and right fenders 16 each have a recess end 16a partially on a rear external side, the recess end 16a being cut out along the external shape of the gas cylinder 5, as shown in FIG. 2.

A gate-shaped rollover protection frame 2 stands substantially perpendicularly viewed from a side in the rear portion of the driver's seat 13, the rollover protection frame 2 having a lower end side on the left and right fixed to the vehicle frame 10. The rollover protection frame 2 is composed of a columnar lower frame 20, an arch-shaped upper frame 21, and a connecting member 22, the lower frame 20 having the lower end side fixed to the vehicle frame 10, the upper frame 21 connecting to the upper end side of the lower frame 20, the connecting member 22 connecting the upper frame 21 to the lower frame 20. The upper frame 21 is mounted on the connecting member 22 to stand upright and fall flat pivoting at a swing support x provided to the connecting member 22. The upper frame 21 is switchable between an upright position and horizontal position. In the upright position, a fixing bolt 23 is fastened and fixed such that the upper frame 21 stands along an extension line of the lower frame 20. In the horizontal position, the fixing bolt 23 is loosened to push the upper frame 21 down to the rear side. With the foldable structure of the rollover protection frame 2, grass around a tree trunk can be mowed while the folded rollover protection frame 2 is not caught by extending branches.

The support device 3 of the gas cylinder 5 hereinafter described is provided on each of the left and right external sides of the rollover protection frame 2. The gas cylinder 5 is mounted on the support device 3, the gas cylinder 5 being filled with LP gas as fuel supplied to the engine 18. The LP gas extracted from the gas cylinder 5 is supplied to a fuel injection device (gas injection; not shown in the drawing) of the engine 18, and thereby the engine 18 operates on the supplied LP gas as fuel.

The left and right pair of front wheels 11 are caster-type free rotating wheels. The left and right pair of rear wheels 12 are driving wheels independent from each other and capable of variable speed and forward and reverse operation. Driving the left and right rear wheels 12 forward or reverse together at an equal speed runs the vehicle straight forward or backward. Applying differential speeds to the left and right rear wheels 12 steers or turns the vehicle in a desired direction. Specifically, an axial plunger-type hydraulic continuously variable transmission (not shown in the drawing) is provided for the left and right to be powered by the engine 18. Output power from the hydraulic continuously variable transmission for the left and right drives the left and right rear wheels 12. A tilt angle operation section of the hydraulic continuously variable transmission and gear shifting levers 17 are linked, the gear shifting levers 17 being anteroposteriorly swingably provided on the left and right of the driver's seat 13. Thus, when the gear shift levers 17 are held at a neutral position in the anteroposterior direction within an operation area thereof, the hydraulic continuously variable transmission is put into a neutral stop state. Shifting the gear shifting levers 17 forward from the neutral position enables forward gear operation, and shifting backward enables backward gear operation.

When the left and right rear wheels 12 are driven at the same speed in rotation directions opposite to each other around a pivoting center P1 (refer to FIG. 2) as a central position of a line connecting rotation axial centers of the rear wheels 12 from a side view, specifically when the first gear shifting lever 17 of the left and right pair is shifted forward from the neutral position in the anteroposterior direction in the operation range and the second gear shifting lever 17 is shifted backward from the neutral position in the operation range for the amount operated forward with the first gear shifting lever 17, the self-propelled vehicle body 1 is driven to pivot around the pivoting center P1. Furthermore, when the first gear shifting lever 17 of the left and right pair is held at the neutral position in the anteroposterior direction in the operation range and the second gear shifting lever 17 is shifted forward or backward from the neutral position in the operation range, the self-propelled vehicle body 1 pivots around a ground contact point of one of the left and right rear wheels 12 as a pivoting point. On the contrary, when the second gear shifting lever 17 of the left and right pair is held at the neutral position in the anteroposterior direction in the operation range and the first gear shifting lever 17 is shifted forward or backward from the neutral position in the operation range, the self-propelled vehicle body 1 pivots around a ground contact point of the other rear wheel 12 of the left and right as a pivoting point.

The mower 4 is suspended and held to the vehicle frame 10 by a link mechanism 40 connected by a left and right pair of front swing links 40a and a left and right pair of rear swing links 40b. A swing arm 42 is connected to the link mechanism 40, the swing arm 42 being integrally provided to a support shaft 41 that swingably supports the rear swing links 40b. The swing arm 42 is configured to swing in association with expansion and contraction of a hydraulic cylinder 43 provided to a space with the vehicle frame 10. The link mechanism 40 is thus operated to move up and down the mower 4, which is switched between a down state of working and an up state of non-working. In the down state of working, a gauge wheel 44 is touched on the ground or substantially touched thereon. In the up state of non-working, the gauge wheel 44 is detached from the ground to be stowed in a lower portion of the vehicle frame 10. The mower 4 is a rear-discharge type that discharges grass cut by a bar blade 45 from a discharge outlet (not shown in the drawing) positioned on the rear side of the self-propelled vehicle body 1.

Support Device

As shown in FIGS. 1 to 6, the support device 3 of the gas cylinder 5 is composed of a support base 30, a wrap fastener 31, an anteroposterior positioner 32, and a circumferential positioner 33. The support base 30 is attached to the rollover protection frame 2. The wrap fastener 31 fixes the gas cylinder 5 to the support base 30 in a mount state. The anteroposterior positioner 32 determines the mounting position of the gas cylinder 5 in the anteroposterior direction. The circumferential positioner 33 positions the gas cylinder 5 around an axial line.

The support base 30 is integrally provided with a mounting plate 30A, a base plate 30B, and triangular reinforcement connecting plates 30C. The mounting plate 30A is fixed to mounting brackets 24 with mounting bolts 25, the mounting brackets 24 being welded and fixed to the front and rear of the lower frame 20 of the rollover protection frame 2. The base plate 30B extends externally to a side from the lower end of the mounting plate 30A. The reinforcement connecting plates 30C are welded and connected at two positions in the anteroposterior direction each in contact with the mounting plate 30A and the base plate 30B on two sides. The base plate 30B is provided substantially in parallel with the anteroposterior centerline L0 of the self-propelled vehicle body 1 from a plan view such that the left and right side portions of the base plate 30B are provided along the anteroposterior direction of the self-propelled vehicle body 1. The base plate 30B has a front portion extending obliquely forward in front downward, a rear portion extending obliquely rearward in rear downward, and an intermediate portion provided as a horizontal surface when the self-propelled vehicle body 1 is in a horizontal position. The base plate 30B having the configuration above is provided in a position covering the rear wheel 12 from a plan view. The base plate 30B, which is positioned above the rear wheel from a side view, also functions as a mud cover of the rear wheel 12.

Figure 4:
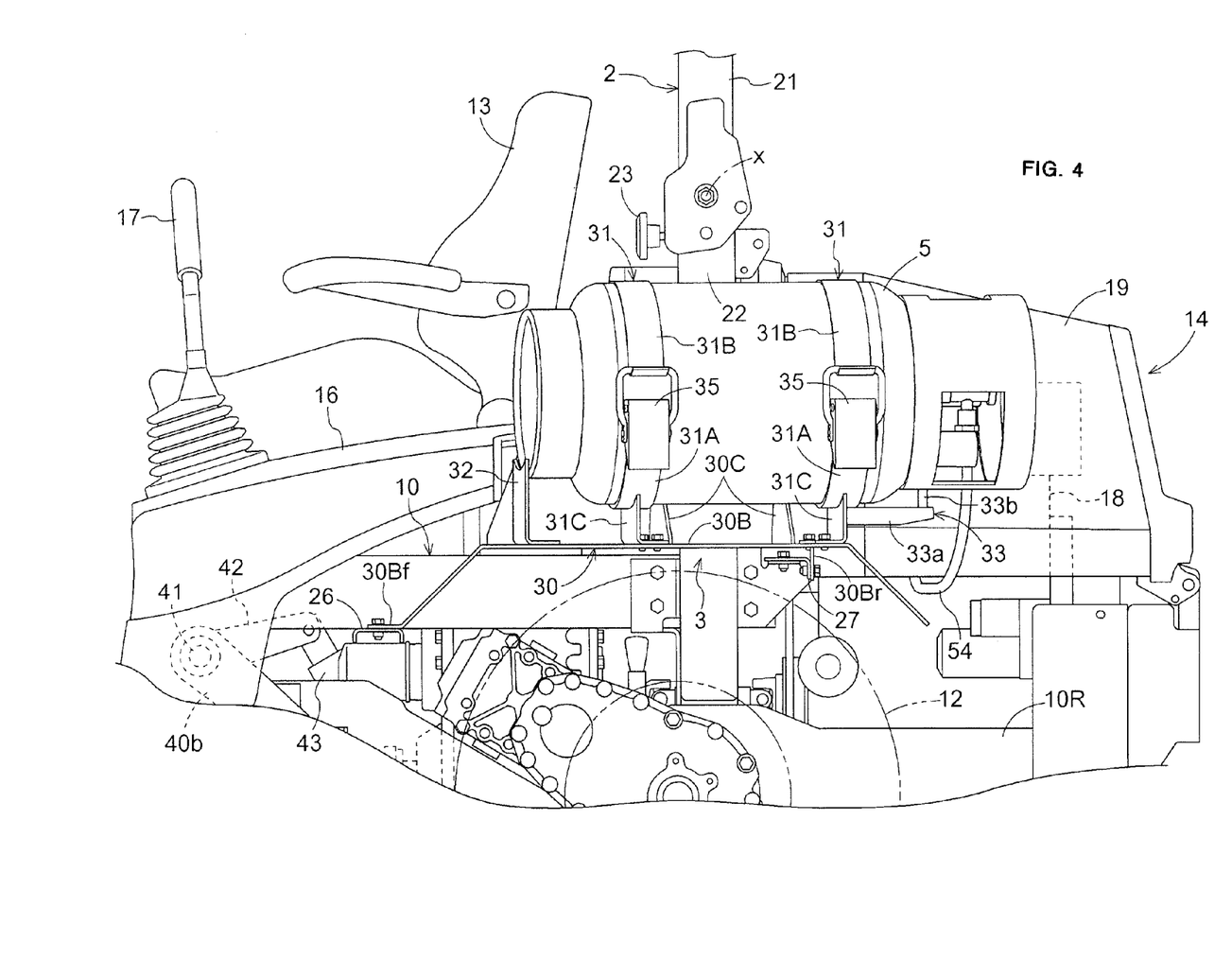
FIG. 4 is a side view illustrating a vicinity of a gas cylinder mounting portion of the riding mower.
Figure 5:
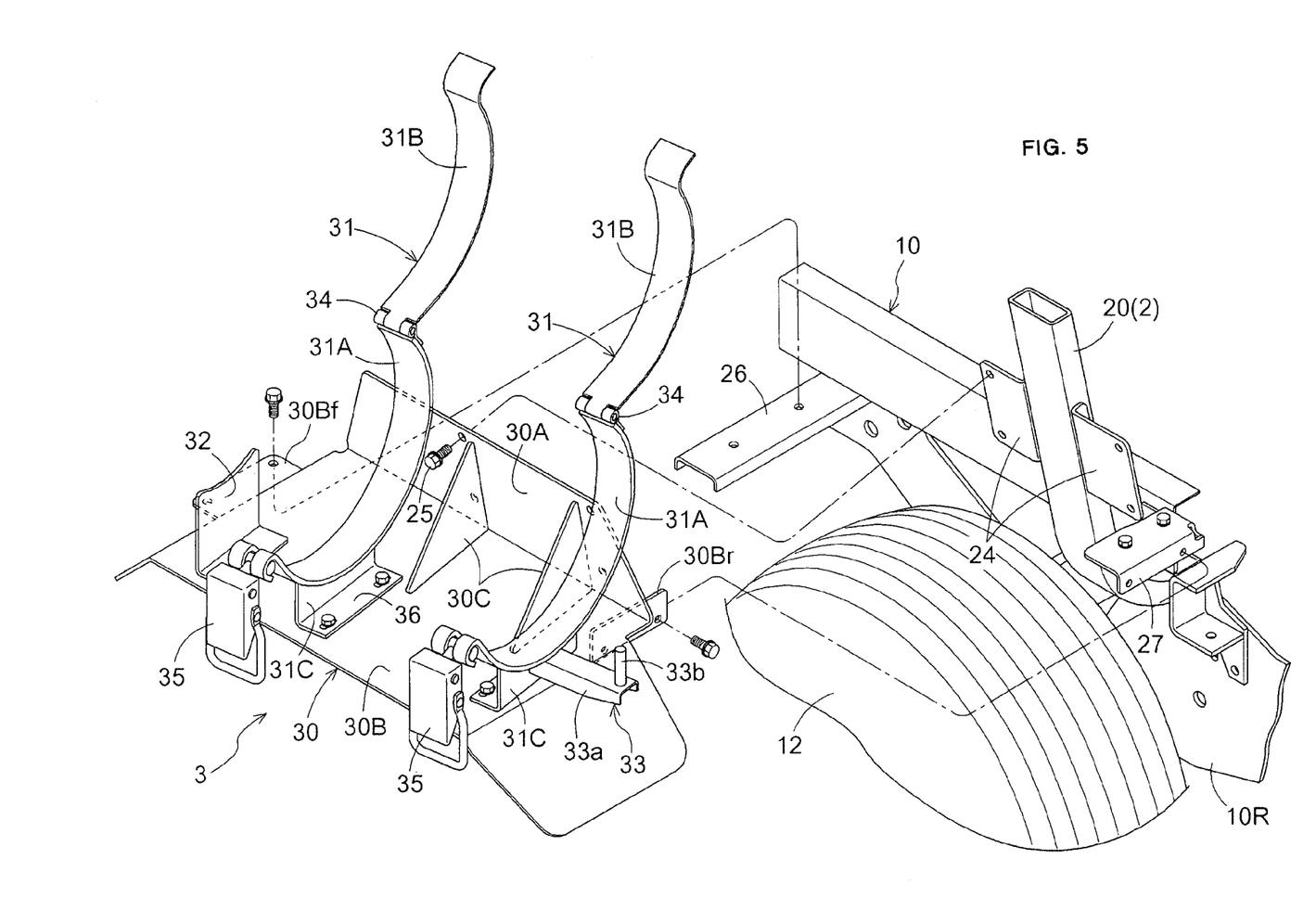
FIG. 5 is an exploded perspective view of a support device portion.

A forward-facing mounting piece 30Bf folded in a horizontal direction is integrally provided to a front end portion of the base plate 30B. As shown in FIGS. 4 and 5, the mounting piece 30Bf is bolt connected to an upper surface of a front support frame 26 extending externally to the side from the vehicle frame 10. Furthermore, a downward mounting piece 30Br is welded and fixed to the rear portion of the base plate 30B, the mounting piece 30Br drooping downward from the lower surface of the horizontal portion of the base plate 30B. As shown in FIGS. 4 and 5, the front surface of the downward mounting piece 30Br is contacted with and bolt connected to a rear surface of a rear support frame 27 extending externally to the side from the vehicle frame 10. There is a gap between the upper surface of the rear support frame 27 and the lower surface of the horizontal portion of the base plate 30B. Thus, the upper surface of the rear support frame 27 does not directly support the lower surface of the base plate 30B.

Figure 6:
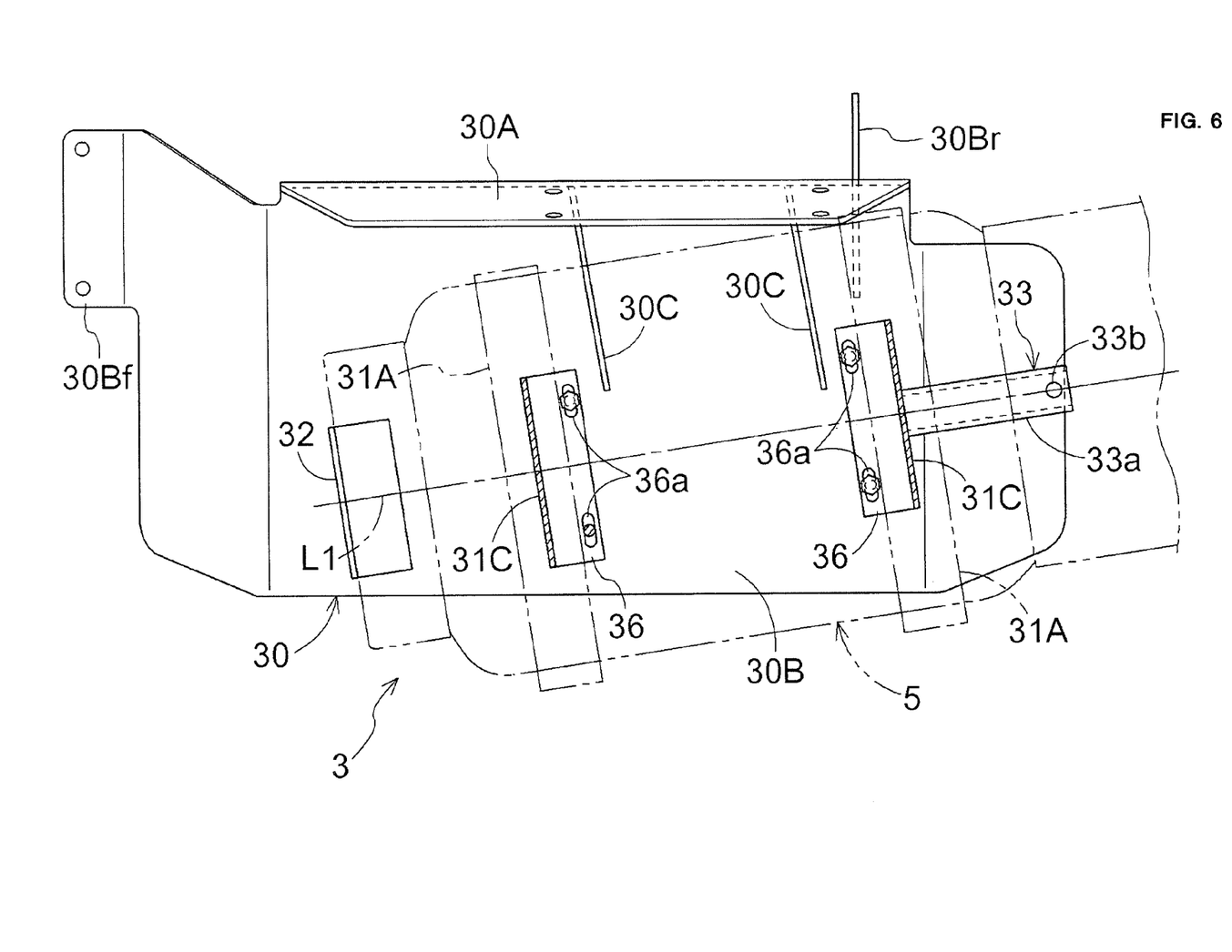
FIG. 6 is a plan view of the support device portion.
Figure 7:
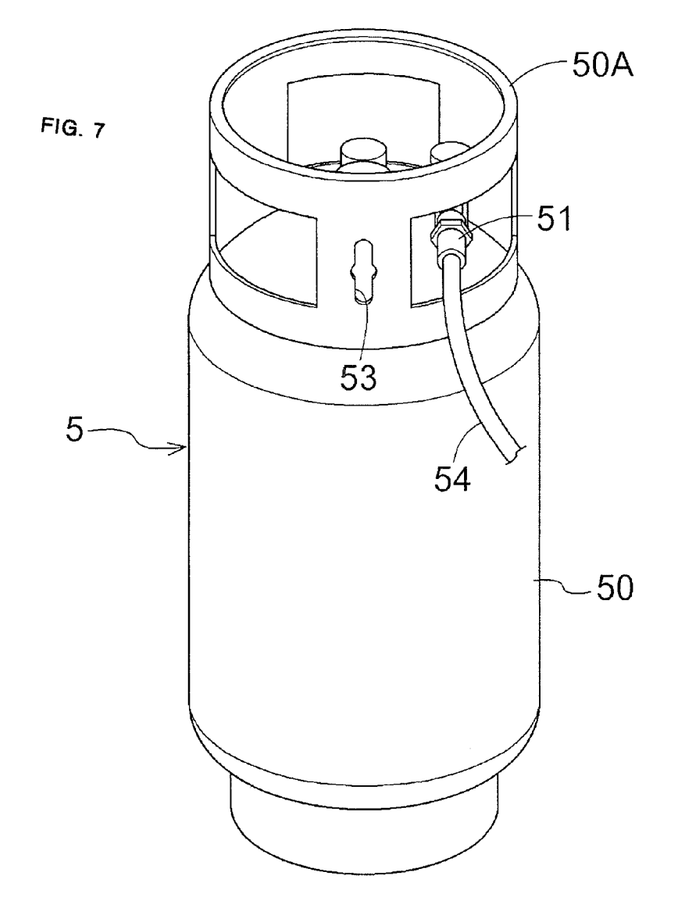
FIG. 7 is a perspective view of a gas cylinder.

The wrap fastener 31 is provided with a lower band member 31A fixed to the base plate 30B, an upper band member 31B connected to one end of the lower band member 31A through a hinge 34, and a foot bracket 31C attaching the lower band member 31A to the base plate 30B. The end portions of the lower band member 31A and the upper band member 31B opposite to the ends connected by the hinge 34 are connected and fixed with a connecting buckle 35. As shown in FIGS. 2 and 6, the wrap fastener 31 is attached such that the gas cylinder 5 is mounted having the central axis L1 tilted by a predetermined angle θ and thereby the axial direction of the gas cylinder 5 fixed by the wrap fastener 31 is closer to the anteroposterior centerline L0 of the self-propelled vehicle body 1 from a plan view.

Thus, the gas cylinder 5 fixed by the wrap fastener 31 is mounted in a state in which the rear end side is also tilted closer to the center in the lateral direction of the vehicle body relative to the base plate 30B provided along the anteroposterior direction of the self-propelled vehicle body 1. The predetermined angle θ is set to approximately 5° to 10° at which the central axis L1 of the gas cylinder 5 fixed by the wrap fastener 31 is tilted against the anteroposterior centerline L0 of the self-propelled vehicle body 1. As shown in FIG. 2, the predetermined angle θ is provided in view of the position of the central axis L1 of the gas cylinder 5 aligned with a tangent L2 relative to a rotation trajectory R of an rear end portion of the self-propelled vehicle body 1 in the case where the self-propelled vehicle body 1 is rotated around the pivoting center P1, which is the central position of a line m connecting the rotation axes of the rear wheels 12. The gravity center g of the gas cylinder 5 in the anteroposterior direction is positioned proximate to the rollover protection frame 2, but slightly closer to the rear side of the vehicle body than the line m connecting the rotation axes of the rear wheels 12. The tangent L2 relative to the rotation trajectory R and the central axis L1 of the gas cylinder 5 are provided orthogonal to a normal line n passing through the gravity center g.

The foot bracket 31C of the wrap fastener 31 is configured to be bolt connected and fixed to the base plate 30B. A bolt hole 36a provided in a mounting plate portion 36 of the foot bracket 31C mounted to the base plate 30B is formed into an elongated hole having a long diameter in a direction orthogonal to the central axis L1 of the gas cylinder 5 to be fixed, thus enabling fine adjustment of the mounting position of the wrap fastener 31 to the base plate 30B.

As shown in FIGS. 4 through 6, a portion close to the front portion of the base plate 30B is fixedly provided with the anteroposterior positioner 32 for determining the mounting position of the gas cylinder 5 in the anteroposterior direction. In a state in which the upper band members 31B of the wrap fasteners 31 are open upward and the gas cylinder 5 is mounted on the upper side of the lower band members 31A, the front end position of the gas cylinder 5 is contacted to the anteroposterior positioner 32. Thereby, the gas cylinder 5 is positioned appropriately in the anteroposterior direction of the wrap fasteners 31. The anteroposterior positioner 32 is welded and fixed to the base plate 30B.

The circumferential positioner 33 extends from the foot bracket 31C of the wrap fastener 31 on the rear side, the circumferential positioner 33 positioning the gas cylinder 5 around the central axis L1. The circumferential positioner 33 is composed of a channel-shaped support body 33a and a pin 33b, the support body 33a extending rearward from the rear surface of the foot bracket 31C on the rear side, the pin 33b standing upward on the rear end side of the support body 33a.

When a container 50 of the gas cylinder 5 is placed horizontally, a gas outlet 51 and a relief valve 52 hereinafter described are positioned upward to extract gas above a liquid surface of liquid gas inside the container 50. The pin 33b of the circumferential positioner 33 is thus inserted to a positioning hole 53 provided in a tubular wall portion 50A projecting from the rear end side of the container 50 of the gas cylinder 5, and thereby the gas cylinder 5 mounted on the support device 3 is positioned appropriately in the circumferential direction, as shown in FIGS. 4 through 6.

The gas cylinder 5 is a commercially available cylinder filled with LP gas and provided with the container 50 having a tubular body portion. In the state in which the tubular body portion of the container 50 is held by the wrap fastener 31 and mounted on the support device 3, the gas outlet 51 and the relief valve 52 are directed rearward of the vehicle body. Fuel gas is supplied to the fuel injection device (gas injection; not shown in the drawing) of the engine 18 through a supply hose 54 connected to the gas outlet 51.

In the state in which the gas cylinder 5 is supported by the support device 3, the upper end of the gas cylinder 5 is positioned lower than the upper end of the driver's seat 13 and positioned lower than the upper end of the lower frame 20 of the rollover protection frame 2. Furthermore, the gas cylinder 5 is disposed at a position similar to or lower than the upper end of the hood 19.

Comparative Example

Figure 8:
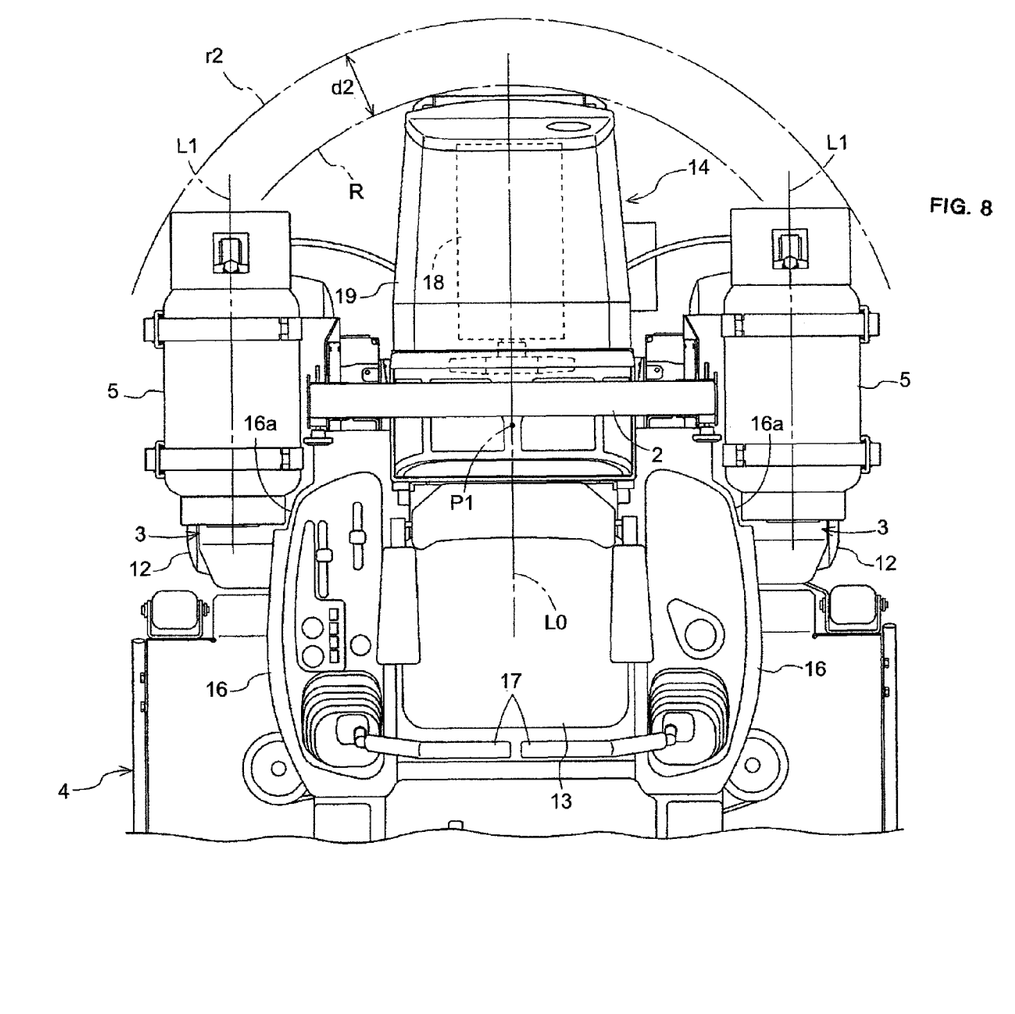
FIG. 8 illustrates a comparative example of a riding mower.

The support device 3 of the present invention is mounted such that the central axis L1 of the gas cylinder 5 is tilted by the predetermined angle θ to the anteroposterior centerline L0 of the self-propelled vehicle body 1, and thereby the rear side is closer thereto from a plan view. In a case of FIG. 8, however, the support device 3 is mounted such that the central axis L1 of the gas cylinder 5 fixed by the wrap fastener 31 is substantially parallel to the anteroposterior centerline L0 of the self-propelled vehicle body 1 from a plan view. A positional relationship between the rotation trajectory R of the rear end portion of the self-propelled vehicle body 1 and the rear end of the gas cylinder 5 in the case is illustrated. As shown in FIG. 8, a rotation trajectory r2 demonstrated by the rear end of the gas cylinder 5 in the structure of the comparative example is distant for a distance d2 from the rotation trajectory R of the rear end portion of the self-propelled vehicle body 1 in the case in which the self-propelled vehicle body 1 is rotated around the pivoting center P1, which is the central position of the line connecting the rotation axes of the rear wheels 12. The distance d2 is substantially greater than a distance d1 between the rotation trajectory R of the rear end portion of the self-propelled vehicle body 1 and a rotation trajectory r1 demonstrated by the rear end of the gas cylinder 5 in the case in which the self-propelled vehicle body 1 according to the present embodiment is rotated around the pivoting center P1, which is the central position of the line connecting the rotation axes of the rear wheels 12 (refer to FIG. 2). Thus, it is more likely with the structure of the comparative example than with the structure of the present embodiment that a portion of the gas cylinder 5 interferes with a wall, a fence, or a tree in the case in which the self-propelled vehicle body 1 is rotated around the pivoting center P1 in a place close to the wall, the fence, or the tree.

With the structure of the embodiment of the present invention, such an interference with the wall, the fence, or the tree is less likely in the case of rotating around the pivoting center P1, compared with the structure of the comparative example.

First Alternative Embodiment

The configuration of engine 18 is not limited to one same as that of a water-cooled gasoline engine and having a device for fuel supply designed for LP gas as explained in the embodiment above. The engine 18 may have a configuration same as an air-cooled gasoline engine and have a device for fuel supply designed for LP gas.

Second Alternative Embodiment

The gas cylinder 5 supported by the support device 3 is not limited to an LP gas type, but may be any gas cylinder 5 of a cylinder type to be filled.

Third Alternative Embodiment

In the embodiment above, the central axis L1 of the gas cylinder 5 mounted on the support device 3 is tilted relative to the anteroposterior centerline L0 of the self-propelled vehicle body 1 such that rear side is closer to the centerline L0 in the lateral direction of the vehicle body. The base plate 30B of the support device 3 is provided such that the left and right side portions are parallel to the anteroposterior centerline L0 of the self-propelled vehicle body 1. Alternatively, the side portions of the base plate 30B of the support device 3 may also be tilted such that the rear side is closer to the anteroposterior centerline L0 of the self-propelled vehicle body 1 in the lateral direction of the vehicle body. In this case, the left and right portions of the side portions of the base plate 30B of the support device 3, or only external sides may be tilted so as to be closer to the anteroposterior centerline L0 of the self-propelled vehicle body 1.

Fourth Alternative Embodiment

The support device 3 is not limited to the structure explained in the embodiment in which the support base 30 is composed of the mounting plate 30A, the base plate 30B, and the reinforcement connecting plates 30C. The base plate 30B and the reinforcement connecting plates 30C may be omitted, and the lower band member 31A of the wrap fastener 31 may be directly fixed and attached to the mounting plate 30A. In this case, the lower band member 31A itself should have strength sufficient to support the weight of the gas cylinder 5.

Fifth Alternative Embodiment

The structure in which the support device 3 is supported by the self-propelled vehicle body 1 is not limited to the vehicle frame 10 and the rollover protection frame 2 both supporting the support device 3. For example, only the vehicle frame 10 may be used to support the support device 3 by appropriately extending a mounting member from the vehicle frame 10. Alternatively, the front and rear portions of the support base 30 of the support device 3 may not be connected to the vehicle frame 10, but may be supported only by the rollover protection frame 2.

The riding mower of the present invention is not limited to a mid-mount type riding mower as illustrated in the embodiment, but may also be applicable to a front-mount type riding mower, for example. Furthermore, the mower is not limited to a rear discharge type, but may be a side discharge type or a mulching type.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A riding mower having left and right driving rear wheels independently drivable forward and backward, a pair of left and right steerable front wheels, a driver's seat provided in a space between the rear wheels and the front wheels, and a gate-shaped rollover protection frame having a lower end side fixed to left and right positions on a rear side of the driver's seat, the riding mower comprising:
a support device provided on an external side of the rollover projection frame and mountable with a cylindrical gas cylinder in a horizontal position, wherein
the support device is provided such that the mounted gas cylinder is positioned along a front and rear of the rollover protection frame and is mounted in a tilted state in which a central axis of the cylindrical gas cylinder is closer to a central side in a lateral direction of a vehicle body toward a rear side as viewed from a plan view,
wherein the support device is mounted on the rollover protection frame, and
wherein a position proximate to an anteroposterior center of gravity of the gas cylinder is supported by the rollover protection frame and the support device is provided over an upper side of a respective rear wheel as viewed from a plan view.

2. A riding mower having left and right driving rear wheels independently drivable forward and backward, a pair of left and right steerable front wheels, a driver's seat provided in a space between the rear wheels and the front wheels, and a gate-shaped rollover protection frame having a lower end side fixed to left and right positions on a rear side of the driver's seat, the riding mower comprising:
a support device provided on an external side of the rollover projection frame and mountable with a cylindrical gas cylinder in a horizontal position, wherein
the support device is provided such that the mounted gas cylinder is positioned along a front and rear of the rollover protection frame and is mounted in a tilted state in which a central axis of the cylindrical gas cylinder is closer to a central side in a lateral direction of a vehicle body toward a rear side as viewed from a plan view,
wherein the support device is mounted on the rollover protection frame, and
wherein the support device is provided with a support base in a position covering the upper side of a respective rear wheel and in parallel to an anteroposterior direction of the vehicle body, and the central axis of the gas cylinder is tilted relative to left and right sides of the support base as viewed from a plan view.

3. A riding mower having left and right driving rear wheels independently drivable forward and backward, a pair of left and right steerable front wheels, a driver's seat provided in a space between the rear wheels and the front wheels, and a gate-shaped rollover protection frame having a lower end side fixed to left and right positions on a rear side of the driver's seat, the riding mower comprising:
a support device provided on an external side of the rollover projection frame and capable of being mounted with a cylindrical gas cylinder in a horizontal position, wherein
the support device is provided such that the mounted gas cylinder is positioned along front and rear of the rollover protection frame and the support device is mounted on the rollover protection frame,
wherein a position proximate to an anteroposterior center of gravity of the gas cylinder is supported by the rollover protection frame and the support device is provided over an upper side of a respective rear wheel as viewed from a plan view.

4. The riding mower according to claim 3, wherein the cylindrical gas cylinder is mounted in a tilted state in which a central axis thereof is closer to a central side in a lateral direction of a vehicle body toward a rear side as viewed from a plan view.

5. The riding mower according to claim 4, wherein the support device is provided with a support base in a position covering the upper side of the respective rear wheel and in parallel to an anteroposterior direction of the vehicle body, and the central axis of the gas cylinder is tilted relative to left and right sides of the support base as viewed from a plan view.

* * * * *